H. H. Craigie,
Water Closet Valve.
No. 103,721.    Patented May 31, 1870.
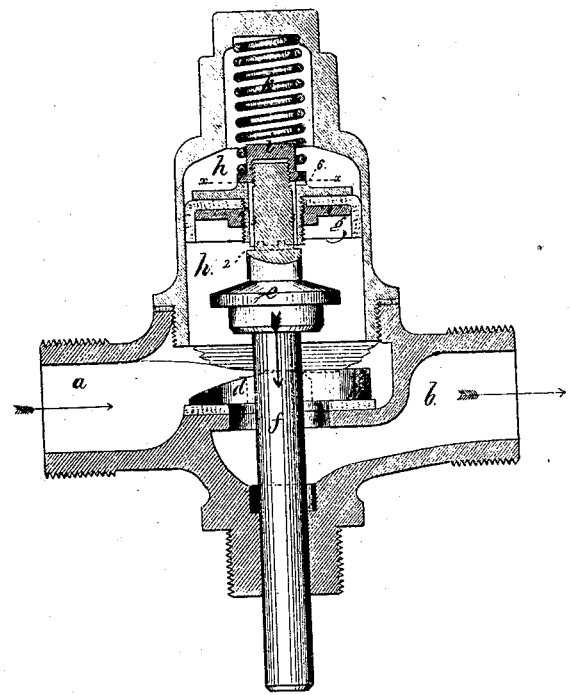
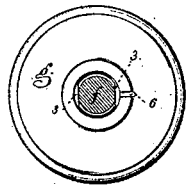
Witnesses,
Harold Serrell
Geo. K. Pinckney
H. H. Craigie

United States Patent Office.

HUGH H. CRAIGIE, OF NEW YORK, N. Y.

Letters Patent No. 103,721, dated May 31, 1870.

IMPROVEMENT IN WATER-CLOSET VALVES.

The Schedule referred to in these Letters Patent and making part of the same.

To all whom it may concern:

Be it known that I, HUGH H. CRAIGIE, of the city and State of New York, have invented and made a new and useful Improvement in Cocks for Water-Closets; and the following is hereby declared to be a full and clear description of the same.

Valves for water-closets have before been made in which a piston has been applied in a chamber into which water is allowed to leak gradually as the valve is closed, and a secondary valve has been applied to allow the water to rush freely into this chamber, as in Letters Patent No. 84,262, granted to me.

My invention relates to a valve-seat with a groove in it, applied in combination with a valve, a piston, and the said chamber and valve to the water-closet, whereby the said groove forms the leakage water-way for the gradual filling or emptying of the said chamber, and, when the piston is moved in the other direction, the valve and grooved seat separate so as to allow the rush of water to keep the said groove free from obstruction by washing the same out at a time when the parts are open, and any obstruction that might have passed into the groove is relieved.

By this means, the groove does not become filled with any obstructions, such as sand, dirt, &c., which frequently exist in the water and obstruct the valves heretofore employed.

In the drawing—

Figure 1 is a vertical section of the cock or valve complete, and

Figure 2 is a plan of the valve-seat and groove at the line $x\ x$.

The inlet-pipe is connected, at $a$, to the hub projecting from the case of the valve, and $b$ is the hub to which the pipe to the water-closet is attached.

The valve-seat $c$ is placed, as usual, between the inlet and outlet water-ways, and I have shown a leather face to said seat, held down by a ring, $d$, as in my patent No. 89,856.

The valve $e$, on the stem $f$, is fitted with the plug to close the seat $c$, as in said patent No. 89,856.

Upon the stem $f$ is the piston $g$, and there is a slight end play of the stem $f$ through the piston $g$, the extent of motion being limited by the shoulder 2 and nut $i$.

The piston $g$ is in the variable chamber $h$, and the valve is pressed upon its seat by the spring $k$.

The portion of the stem $f$ that passes through the piston $g$ fits the same loosely, or portions are filed off to form water-ways, as seen at 3 3, and the lower edge of the hub of the piston, next the shoulder 2, is also notched to form openings for the water.

The surface of the piston $g$, next the nut $i$, and the under surface of said nut, form a valve and seat, in one of which is a groove, 6. I have shown said groove as in the piston $g$; and the operation of the parts is as follows:

When the valve-stem $f$ is pressed endwise against the spring $k$, there is a free water-way between the valve $i$ and its seat, on $g$, and water passes through the ways 3, in order that the water contained in the variable chamber $h$ may not obstruct the opening of the valve.

When pressure on $f$ is removed, and the valve commences to close in the direction of the arrow, the seat on $g$ closes against $i$, and water cannot pass into that part of the chamber $h$ above the piston $g$, except through the groove 6, and thus the valve can only close at a certain speed, according to the relative proportion of the jet going through this groove and the chamber $h$, to be supplied as the valve and piston move.

If any obstruction gets into this groove, it is freed and washed out when the valve is being opened.

I do not claim a valve with a groove in the seat, placed in the stem of the water-closet cock.

What I claim as my invention is—

The stem $f$, having an end movement through the piston $g$, and a water-way, 3, between the stem and piston, in combination with the nut $i$, forming a valve, and the groove 6, for a water leakage, as and for the purposes set forth.

Signed this 10th day of November, A. D. 1869.

H. H. CRAIGIE.

Witnesses:
HAROLD SERRELL,
GEO. T. PINCKNEY.